Figure 1:
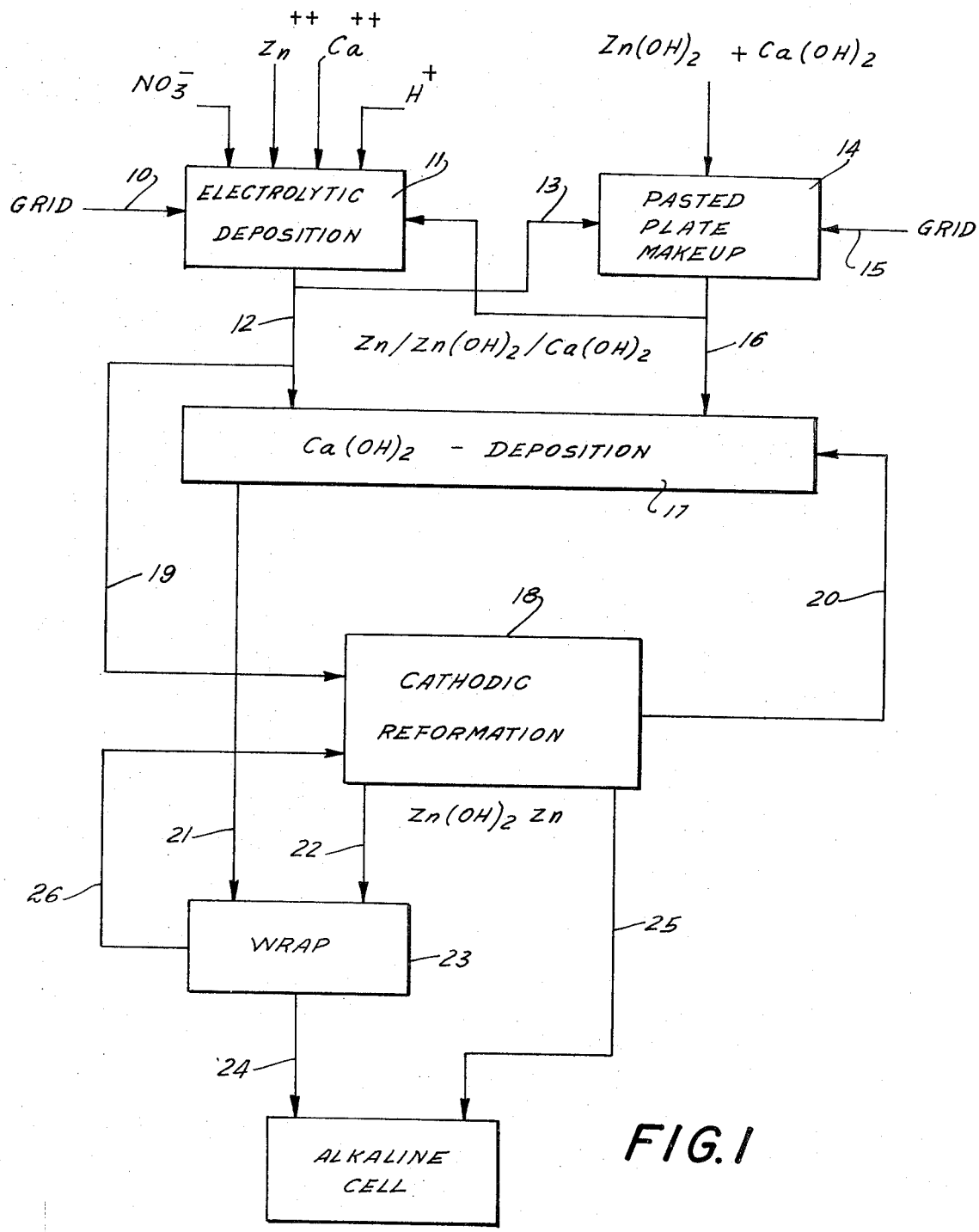

United States Patent
Kandler

[11] 3,873,367
[45] Mar. 25, 1975

[54] ZINC-CONTAINER ELECTRODE

[75] Inventor: Ludwig Kandler, Munich-Solln, Germany

[73] Assignee: Rheinisch-Westfalisches-Elektrizitatswerk Aktiengesellschaft, Essen, Germany

[22] Filed: Mar. 12, 1973

[21] Appl. No.: 340,307

Related U.S. Application Data
[63] Continuation of Ser. No. 64,419, Aug. 17, 1970, abandoned.

[52] U.S. Cl. .............................................. 136/30
[51] Int. Cl. ........................................ H01m 43/02
[58] Field of Search ......... 136/30, 31, 125, 126, 20, 136/19, 75–76, 6 R, 9

[56] References Cited
UNITED STATES PATENTS
| | | | |
|---|---|---|---|
| 1,576,974 | 3/1926 | Huebner | 136/31 |
| 1,918,947 | 7/1933 | Williams | 136/36 |
| 3,226,260 | 12/1965 | Drengler | 136/30 |
| 3,272,653 | 9/1966 | Solomon et al. | 136/6 |
| 3,451,851 | 6/1969 | Stanimirovitch | 136/30 |
| 3,477,875 | 11/1969 | McQuade | 136/6 SA |
| 3,516,862 | 6/1970 | Van Der Grinten | 136/30 |
| 3,607,409 | 9/1971 | Hamlen et al. | 136/30 |

*Primary Examiner*—Anthony Skapars
*Attorney, Agent, or Firm*—Karl F. Ross; Herbert Dubno

[57] ABSTRACT

A negative electrode for an alkaline accumulator comprises a central conductive support and an electrochemically effective mass adhering to that support on opposite sides thereof, this mass consisting of active material in the form of zinc and/or zinc compounds mixed with a reactant such as calcium hydroxide. The mass forms a stack of three layers on each side of the support, i.e., an inner layer with the active material predominating and an intermediate layer with the reactant predominating and an outer layer consisting exclusively of the reactant. The latter may penetrate into interstices of a porous synthetic-resin covering, such as a nylon wrapper, surrounding the electrode body.

8 Claims, 2 Drawing Figures

ZINC-CONTAINER ELECTRODE

This is a continuation of application Ser. No. 64,419, filed Aug. 17, 1970, now abandoned.

The present invention relates to zinc-containing electrodes and, more particularly, to a zinc-containing negative electrode for use in alkaline storage cells or batteries and, preferably, as counterelectrodes to silver/silver oxide and nickel/nickel oxide electrodes in such batteries.

The use of zinc as a electrochemically active substance in alkaline, acid or neutral electrolytes has become widespread over the years because of the high reactivity and electronegativity of zinc in substantially all environments. Problems such as the autosolubilization of zinc metal, which have frequently concerned the art, have in part been solved by amalgamation of the zinc.

When, however, zinc-containing electrodes are to constitute the negative electrode of an alkaline accumulator, storage cell or battery, a host of special problems are encountered. Firstly, metallic zinc and its alloys are readily soluble in the alkaline electrolyte and, consequently, the discharge/charge cycle involves a solubilization of zinc in the electrolyte and the formation of zincate ions on discharge, and the redeposition of zinc upon the electrode from the solution on charge. The replating or redeposition of zinc occurs in the form of treed or branched crystals having sharp points (dendrites) which readily bridge the gap between the plates of opposite polarity, thereby causing short circuits and the destruction of the cell. Where dendrite formation is not a problem because of the wide spacing of the plates, the cell has a low power-to-volume or power-to-weight ratio. It has been proposed to provide wrappings of cellophane or the like about the zinc electrode, the cellophane constituting a semipermeable membrane separating opposite-polarity plates, but this expedient has reduced the number of charge/discharge cycles which the cell is able to tolerate and has also reduced power output, discharge rate and charging rate. Another problem frequently encountered in connection with zinc negative electrodes is that of "shape change" since the redeposition of zinc-containing material from solution does not generally occur uniformly over the entire surface of the plate.

It is, therefore, the principal object of the present invention to provide a negative zinc-containing plate for alkaline accumulators (i.e., alkaline storage batteries or cells) which permits an increased number of charge/discharge cycles and yet restricts dendrite formation and the tendency to form short-circuit bridges between the opposite-polarity plates or electrodes.

Another object of this invention is to provide an improved storage cell or battery with elevated cycle life, reduced tendency to breakdown by short-circuit, and freedom from the other problems hitherto encountered with dendrite growth in zinc-containing alkaline cells.

Zinc plates are known in which the active mass (i.e. the mass participating in a principal electrochemical reaction at the electrode) comprises zinc in metallic or compound form and is present in association with at least one reactant capable of forming corresponding zincates of low solubility in the electrolyte during discharge of the plate. The reactant may be an alkaline-earth-metal hydroxide, the compound formed being the corresponding low-solubility alkaline-earth-metal zincate. Of particular suitability, in this connection, is calcium hydroxide although magnesium hydroxide may also be used. In the first case the product is calcium zincate while in the second case it is megnesium zincate. The formation of the alkaline-earth zincates from the substantially instantaneous reaction of the alkaline-earth hydroxide and the solubilizing zinc, during discharge, does not irreversibly remove the reacted zinc from the system in terms of the active mass; moreover, it has been found that the zinc redeposits or replates from the low-solubility zincate in the form of a porous spongy mass. While it is doubtful that the spongy porous mass is formed directly from the precipitated alkaline-earth zincate, this hypothesis cannot be excluded although it is assumed that the small quantity of this low-solubility compound which is in the solution, is readily depleted by electrodeposition and galvanic techniques and is replenished from the low-solubility salt which is precipitated from the solution.

Such a negative electrode plate, containing zinc as an electrochemically active metal, may also comprise an inner conductive grid or current distributor/collector, e.g., a metal foil or wire mesh, which is imbedded on all sides in a mixture of metallic zinc or a zinc compound and the aforementioned reactant, the mass being packed around the conductive support. In this construction, the supply of electric current to the plate as well as the withdrawal of electric current therefrom takes place at the center of the plate, i.e., in the immediate vicinity of the conductive grid or support, whereby the conversion of metallic zinc to low-solubility zinc compounds during discharge is effected from the center outwardly in a progressive fashion. The reduction of the zinc compounds during charging of the cell, conversely, takes place from the interior outwardly as a result of the low conductivity of the slightly soluble compounds.

It has been found to be advantageous to provide the electrochemically active mass (i.e., zinc or zinc compounds) in a porous form and, in addition, to provide means for preventing the mixture from sloughing or breaking away from the plate. The latter means may include a porous synthetic-resin layer surrounding the porous mass which, in turn, surrounds the conductive support on all sides. The porous synthetic-resin layer may be a fabric (woven) or a fleece or felt mat of filaments (nonwoven), and the pores of this synthetic-resin layer or sheet may be at least partly filled with the auxiliary reactant, i.e., an alkaline-earth-metal hydroxide and especially calcium hydroxide. Best results are obtained when the supporting wrapping of synthetic-resin layers is carried by the conductive support, e.g., via spacers which define the thickness of the deposit of the active mass packed around this support.

In making an electrode of this description the zinc or zinc compounds and the auxiliary reactant are electrochemically deposited upon the conductive support from an electrolyte. The electrolyte contains, in addition to zinc ions and ions of the auxiliary reactant such as calcium hydroxide, further ions of a substant which is reduced by hydrogen-ion consumption. When the metallic grid or support is subjected to a cathodic polarization in this electrolyte, the resulting precipitate consists of spongy metallic zinc, zinc hydroxide and calcium hydroxide in a porous mass. Thus, the metallic zinc and the zinc hydroxide are deposited simultaneously and, in view of the fact that the low-solubility zincate salt is formed during discharge of the plate, all three of the components (zinc, zinc hydroxide and calcium hydroxide) are electrodeposited simultaneously. The consumption of hydrogen ions in the reduction of the aforementioned further ions permits a shift in the pH value during the process, apparently thereby yielding zinc hydroxide and calcium hydroxide. Best results are obtained when nitrate ions are present in the electrolyte as consumers of hydrogen ion.

According to one aspect of my present invention, the electrodeposition of metallic zinc and/or zinc compounds along with the auxiliary reactant is carried out with a succession of different electrolytes varying in their relative concentration of zinc ion, calcium ion and nitrate ion. In this way, the alkaline-earth-metal hydroxide can be deposited exclusively or in combination with metallic zinc and/or zinc hydroxide in a plurality of layers. I prefer to vary the composition of the electrolyte in such a way that a preponderance of zinc and/or zinc hydroxide or an excess thereof over the calcium hydroxide is deposited in a first stage from one electrolyte, while equimolar quantities of calcium hydroxide and zinc and/or zinc hydroxide are deposited in the next stage. The last layer can, of course, be calcium hydroxide exclusively so that a sheath thereof is provided as a protective layer for the electrode, the sheath preventing undesirable reactions between the active materials and the other materials of the system.

Alternatively, I may prepare the electrode of the present invention by mechanically mixing zinc or zinc compounds with the alkaline-earth-metal compounds and to form a paste from the mixture which is applied to the support; alternatively, the support may be imbedded in the paste so that in either case the support or grid is fully surrounded by the active material. The technique may, however, be combined with the one previously described so that, for example, a pasted plate may be coated with zinc and/or zinc hydroxide and/or calcium hydroxide by electrodeposition as set forth above, or an electrodeposited mass of zinc and/or zinc hydroxide and/or calcium hydroxide may be coated with a paste of zinc and/or zinc compounds and/or calcium hydroxide. Best results are obtained when the final (outermost) layer is a layer of electrodeposited calcium hydroxide. The electrode may be wrapped in a porous synthetic-resin layer as noted above, the pores of this layer being at least in part filled with an auxiliary substance as also mentioned earlier. Deposition of the auxiliary substances in the pores can be conveniently carried out by initially immersing the synthetic-resin layer in a solution of alkaline-earth-metal ions and thereafter dipping the impregnated layer into an alkaline solution (e.g., aqueous sodium or potassium hydroxide). As a result, the corresponding alkaline-earth-metal hydroxide will be formed in the wrapping layer. Moreover, the process may be repeated several times to obtain the desired concentration of the alkaline-earth-metal hydroxide in the wrap.

According to another feature of this invention, following the preparation of a layered electrode as described above, the electrode is subjected to cathodic reformation in an alkaline electrolyte to convert substantially all of the zinc hydroxide to finely divided metallic zinc in uniform and intimate contact with the calcium hydroxide. Upon charging and discharging of the electrode, dendrite formation is excluded while other parameters of the electrode are not substantially changed.

Figure 2:
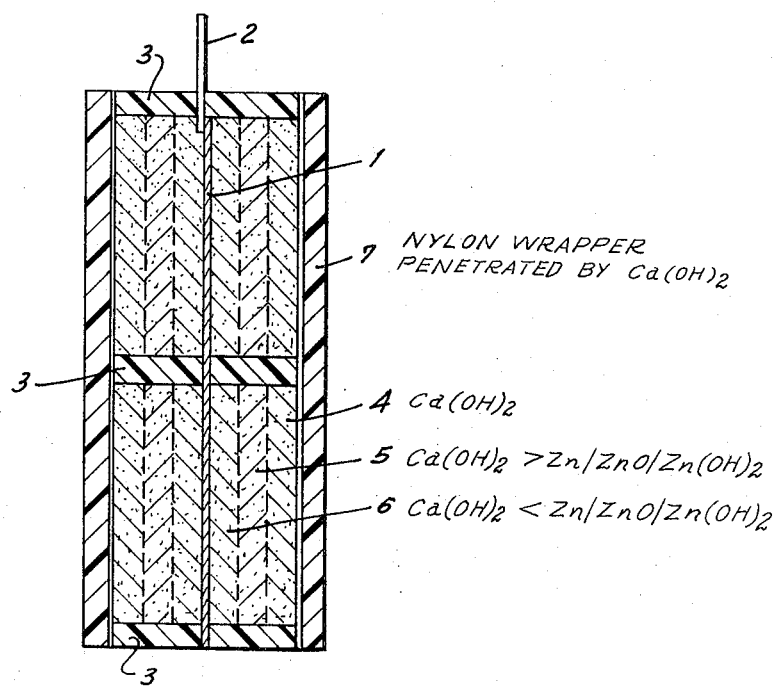

The above and other objects, features and advantages of the present invention will become more readily apparent hereinafter, reference being made to the accompanying drawing in which:

FIG. 1 is a flow diagram illustrating the manufacture of an electrode embodying my invention; and FIG. 2 is an electrode as made by the process of FIG. 1.

The electrode shown in FIG. 2 comprises a metallic support 1 in the form of a wire grid of zinc-plated copper to which a terminal tab 2 is spot-welded. On the edges and in the middle of the support 1 there are provided, on both sides of the support, spacers 3 in the form of plexiglass rods or ribs, held in place by cement. The space within the outlines of the plate and flush with the rods 3 is filled with the electrochemically effective mass in three layers 4, 5, 6. The inner layer 6 is a zinc-enriched layer in which the molar concentration of metallic zinc exceeds the calcium molar fraction while the second layer 5 is rich in calcium hydroxide in the sense that the molar concentration of thereof exceeds that of metallic zinc or zinc compounds. The outer layer 4 consists exclusively of calcium hydroxide and the plate is surrounded by a layer 7, wrapped therearound, consisting of porous synthetic resin, e.g., a nonwoven fabric of nylon filament, impregnated with calcium hydroxide.

In FIG. 1 I have diagrammatically represented the several stages of the process for making such an electrode. A grid 10 may be treated in an electrolytic deposition stage 11, with an electrolyte containing nitrate ion, zinc ion, calcium ion and hydrogen ion, to produce a plate at 12 in which the active material consists of metallic zinc, zinc hydroxide and calcium hydroxide. Where desired, this plate may be provided as shown at 13 and 14 with a pasted layer of zinc oxide or hydroxide and/or calcium oxide or hydroxide. Alternatively, the grid may be supplied at 15 to station 14 at which a zinc hydroxide/zinc oxide and calcium hydroxide/calcium oxide plate is prepared. The plates obtained at 12 and 16 may be led to a further station 17 at which calcium hydroxide is electrodeposited thereon as the outer sheath, the resulting plate being subjected to cathodic reformation at 18 to convert the zinc hydroxide to finely divided metallic zinc. Alternatively, the plate 12 may be led at 19 to the cathodic-reformation stage and only thereafter will the outer layer of calcium hydroxide be applied as shown at 20. The resulting plates, with or without a final cathodic reformation as shown at 21 and 22, may be wrapped at 23 and introduced into an alkaline cell with nickel or silver counterelectrodes as shown at 24. The plate 25 obtained from the cathodic-reformation stage may be similarly introduced directly into the cell. The wrapping step may be followed by cathodic reformation as shown at 26.

EXAMPLE I

A zinc-plated wire mesh of rectangular configuration and having dimensions of 31 × 51 mm was provided with a metal tab by spot-welding and was formed with spacer ribs along the edges on both sides of the support. The spacers were composed of plexiglass and were cemented to the wire grid. The electrode thus prepared was immersed in an electrolyte containing 600 gr./liter of zinc chloride and 200 gr./liter of calcium nitrate in water, the bottom of the vessel having been provided with a layer of zinc oxide. Using the electrode as a cathode against a zinc anode, electrolysis was carried out for two hours at a current of 0.5 amperes. Thereafter, the electrode was cathodically electrolyzed in an electrolyte containing 800 gr./liter of calcium nitrate over a period of one half-hour with a current of 0.3 amperes. The electrode was then immersed in an aqueous potassium hydroxide solution (37%) and electrolyzed for 20 hours with a current of 0.1 amperes. In this last step, zinc compounds previously deposited were reduced to metallic zinc. The electrode was then dipped, after rinsing, in a mercury chloride solution to amalgamate the zinc. Under light pressure, a nonwoven synthetic-resin layer (Viledone) was wrapped around the electrode and cemented to the spacers. The electrode was thereupon dipped in a calcium chloride solution and then again in a potassium hydroxide solution to precipitate calcium hydroxide in the pores of the wrap. The electrode was then used in a storage battery in which nickel III oxide constituted the counterelectrode, or in combination with an air electrode in a zinc/air battery. In each case, potassium hydroxide served as the electrolyte. The plate had a capacity of 1.4 ampere-hours corresponding to 10.5 ampere-hours/decimeter$^2$ of apparent surface. Repeated charge/discharge cycling showed no evidence of dendrite formation.

EXAMPLE II

Upon the grid prepared as in EXAMPLE I, a viscous paste was coated flush with the spacers, the paste consisting of equal parts by weight of zinc oxide and calcium hydroxide in the presence of sufficient water to impart a pasty consistency to the mass. After drying, a synthetic resin layer of nonwoven fabric as described in Example I was supplied and the plate was thereafter electrolyzed in an electrolyte containing 800 gr./liter of calcium nitrate as described in Example I. After a cathodic treatment in potassium hydroxide solution, the electrode was found to have a capacity of 1.1 ampere-hours.

EXAMPLE III

Following the procedure outlined in Example II up to the provision of the synthetic-resin layer of nonwoven fabric, the electrode was cathodically electrolyzed in a solution containing 400 gr./liter of zinc chloride and 400 gr./liter of calcium nitrate for one half hour at a current of 0.5 amperes. The electrode was then processed in the calcium nitrate solution as described in Examples I and II. The electrode was subsequently cathodically treated in potassium hydroxide solution and was found to have a capacity of 1.6 ampere-hours.

I claim:
1. A negative electrode for an alkaline storage cell, comprising active material, selected from the group which consists of metallic zinc and zinc compounds, mixed with a further compound of an alkaline-earth reactant capable of forming low-solubility zincates upon the passage of zinc into solution on discharge of the electrode, the proportion of said active material decreasing outwardly from the interior of said mass to zero at the exterior thereof and the proportion of said reactant increasing outwardly from the interior of said mass to 100% at the exterior thereof.
2. The electrode defined in claim 1 wherein said reactant is calcium hydroxide.
3. The electrode defined in claim 1, further comprising a conductive support, said mass being symmetrically distributed on opposite sides of said support.
4. The electrode defined in claim 3, further comprising a porous synthetic-resin covering surrounding said mass.
5. The electrode defined in claim 4, further comprising spacer means projecting through said mass and carried by said support while holding said covering away from said support.
6. The electrode defined in claim 5 wherein the pores of said covering are at least partly filled with said reactant.
7. The electrode defined in claim 1 wherein said mass is divided into a plurality of layers containing said active material and said reactant in different proportions, the outermost layer consisting exclusively of said reactant.
8. A negative electrode for an alkaline storage cell, comprising a generally flat conductive support and an electrochemically effective mass composed of active material mixed with calcium hydroxide, said active material being selected from the group which consists of zinc and zinc compounds; said mass being divided into two stacks of layers separated by said support, the layers of each stack including an inner layer lying against said support, an intermediate layer overlying said inner layer, and an outer layer overlying said intermediate layer; said inner layer containing a preponderance of said active material, said intermediate layer containing a preponderance of calcium hydroxide, said outer layer consisting exclusively of calcium hydroxide.

* * * * *